United States Patent [19]
Kim et al.

[11] Patent Number: 5,633,901
[45] Date of Patent: May 27, 1997

[54] PERMANENT POOL CAVITY SEAL FOR NUCLEAR REACTOR

[75] Inventors: In-Yong Kim, Yoosung-Ku; Moon-Wook Lee; Gyu-Mahn Lee, both of Seo-Ku; Jeong-Ki Hwang, Yoosung-Ku; Tae-Myung Shin, Seo-Ku; Beom-Shig Kim, Yoosung-Ku, all of Rep. of Korea

[73] Assignee: Korea Atomic Energy Research Institute, Daejeon-Si, Rep. of Korea

[21] Appl. No.: 503,615

[22] Filed: Jul. 18, 1995

[30] Foreign Application Priority Data

Apr. 21, 1995 [KR] Rep. of Korea ............... 95-9410

[51] Int. Cl.$^6$ .................................................. G21C 13/028
[52] U.S. Cl. ................................... 376/203; 376/205
[58] Field of Search ................................ 376/203, 204, 376/205

[56] References Cited

U.S. PATENT DOCUMENTS

| | | | |
|---|---|---|---|
| 4,747,993 | 5/1988 | Hankinson et al. | 376/205 |
| 5,102,612 | 4/1992 | McDonald et al. | 376/203 |
| 5,230,860 | 7/1993 | Behnke et al. | 376/203 |
| 5,272,732 | 12/1993 | Chiang | 376/203 |
| 5,323,427 | 6/1994 | Hankinson | 376/203 |
| 5,359,632 | 10/1994 | Bottoms et al. | 376/203 |
| 5,434,894 | 7/1995 | Chiang et al. | 376/203 |

*Primary Examiner*—Daniel D. Wasil
*Attorney, Agent, or Firm*—Armstrong, Westerman, Hattori, McLeland & Naughton

[57] ABSTRACT

A nuclear containment arrangement has a permanent pool cavity seal extending across an annular gap between a reactor pressure vessel and a refueling pool wall to provide a water tight seal therebetween. A seal plate has a support ring with a cylindrical section weldedly connected to an outer seal ring on an embedded ring. A J-shaped flexible ring attached to the seal plate allows axial and radial movement of the reactor vessel during thermal expansion and contraction. The inner portion of the seal plate overhangs the J-shaped flexible ring thereby to protect it from damage resulting from an object dropped thereon. Cooperating access holes and access hole covers in the seal plate provide access to the refueling pool cavity. Support arms underneath the seal plate are provided. Each support arm may have leveling screws to adjust the level of the seal plate. This provides a permanent pool cavity seal that permits flooding of the refueling pool for refueling with it only being necessary to remove the access hole covers for normal reactor operations.

4 Claims, 2 Drawing Sheets

PERMANENT POOL CAVITY SEAL FOR NUCLEAR REACTOR

FIELD OF THE INVENTION

The present invention relates to a permanent pool cavity seal for a nuclear reactor.

BACKGROUND OF THE INVENTION

A pressurized light water reactor operation is an established operation which is normally carried out with a high degree of reliability. In such reactors, a reactor vessel is positioned in a refueling pool cavity formed by a wall of the concrete shielding structure in a containment device. The refueling pool cavity has instruments positioned therein for monitoring reactivity. The refueling pool and the refueling pool cavity accomodate thermal expansion of the reactor during operation and provide a path for air flow from the bottom of the reactor vessel. Prior to refueling the reactor, the refueling pool is flooded with berated water to provide neutron shielding while the reactor vessel head is removed. To protect instrumentation in the refueling pool cavity, it is necessary to install a seal plate over the cavity before the water is added.

During normal reactor operations the reactor vessel is subjected to radial and axial thermal expansion. Consequently, the seal plate currently in use for refueling operation can not be left installed around the reactor vessel and the refueling pool floor in the concrete shielding structure after refueling because it is unable to accomodate the thermal expansion of the reactor vessel. Attempts made at developing a permanent pool cavity seal, that does not require removal after refueling, have, as yet, not been completely successful.

SUMMARY OF THE INVENTION

The present invention provides a nuclear reactor containment arrangement wherein a permanent pool cavity seal extends across an annular gap between a reactor vessel having a peripheral wall and a horizontally extending flange, and a refueling pool wall which is a concrete shielding structure in the containment organization. The seal plate has a J-shaped flexible ring having an inner downwardly and then horizontally extending section welded at its inner periphery to an inner seal ring which is bolted and sealingly to the reactor vessel flange, and a support ring having an outer downwardly extending cylindrical section welded to an outer seal ring which is bolted and sealingly welded to a ring embedded in a refueling pool floor. The J-shaped flexible ring allows movement of the reactor vessel during thermal expansion and contraction. The permanent pool cavity seal which it provides, is strong and flexible. The permanent pool cavity seal, as it must be, is structurally strong enough to withstand the weight of the water and the impact of the heaviest object which might be dropped inadvertently thereon, without an ensuing a complete or sudden loss of shielding water, and, preferably, with the sealing integrity being substantially maintained. An inner portion of the seal plate overhangs the J-shaped flexible ring to protect it against an object being dropping thereon. The permanent pool cavity seal is also structurally flexible enough to accomodate the redial and the axial thermal expansion and contraction of the the reactor vessel relative to the concrete shielding structure during reactor operation, while substantially maintaining its sealing integrity. A cooperating access hole and access hole cover in the seal plate provide access to the refueling pool cavity. A plurality of support arms underneath the seal plate are provided. Each support arm may have at least a leveling screw to adjust the level of seal plate. This provides a permanent pool cavity seal which allows flooding of the refueling pool for refueling with it only being necessary to remove the access bole covers for normal reactor operations.

BRIEF DESCRIPTION OF THE DRAWINGS

The invention may be better understood by referring to the detailed description of the invention when taken in conjunction with the accompanying drawing in which.

DESCRIPTION OF THE PREFERRED EMBODIMENT

Figure 1:
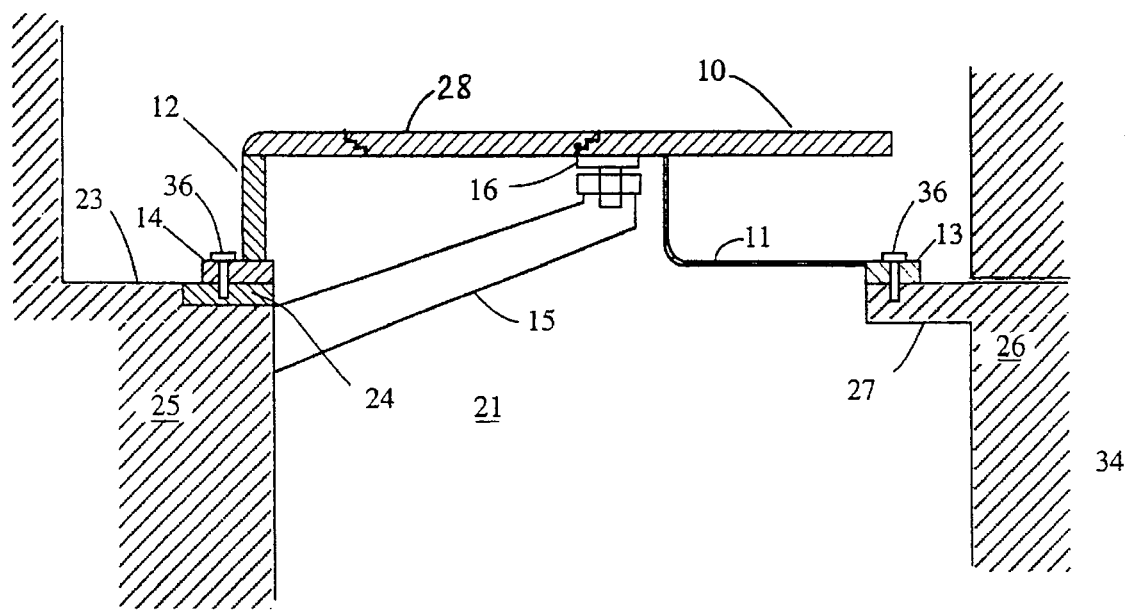
FIG. 1 is a schematic elevational view of the invention.
Figure 2:
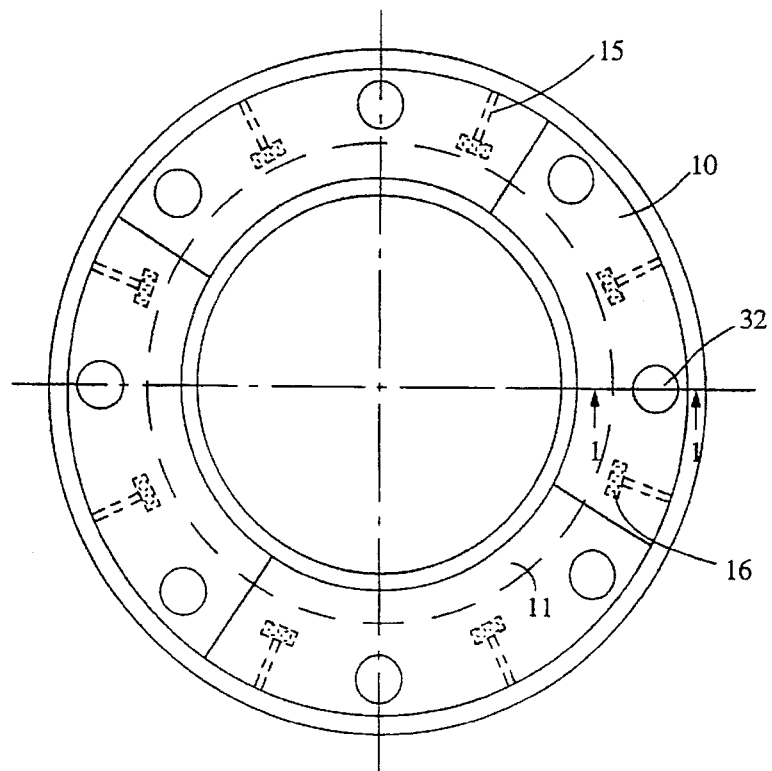
FIG. 2 is a schematic top plan view of the invention.
Figure 3:
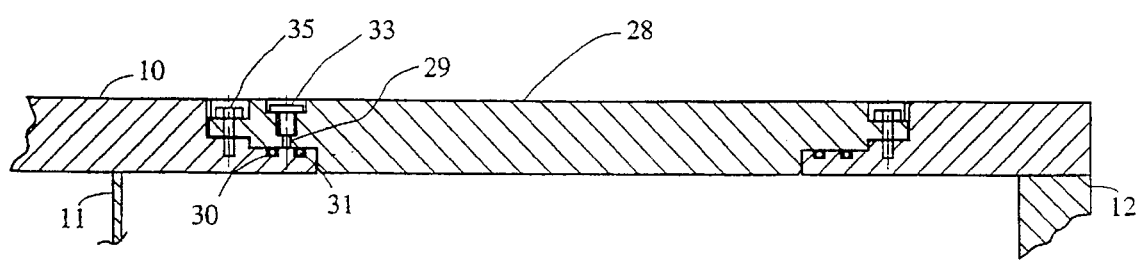
FIG. 3 is a an elevational cross-sectional view through an access hole cover, taken along lines 1—1 of FIG. 2.

The permanent pool cavity seal according to the invention is generally comprised of seal plate 10, inner seal ring 13, outer seal ring 14, J-shaped flexible ring 11, support ring 12, leveling screw support arm 15, leveling screw 16, and means for covering and sealing access hole 32 in seal plate 10.

Seal plate 10 is an annular member preferably formed from stainless steel, which is 1.5 inches in thickness for withstanding the weight of the water and the impact of any fuel which may be dropped during the refueling operation. Seal plate 10 is formed from a plurality of arcuate plates such that they form an annular seal plate 10 when positioned adjacent to each other around reactor vessel 26. The arcuate plates are splice welded together before being welded respectively to support ring 12 and J-shaped flexible ring 11. Seal plate 10 is provided with a plurality of access holes 32 spaced around its circumference. Access holes 32 provide access to nuclear instruments positioned therebelow in the refueling pool cavity 21 between reactor vessel 26 and concrete shielding structure 25 and allow circulation of air from beneath reactor vessel 26 during normal reactor operations. Each access hole 32 in seal plate 10 has two annular concentrically disposed grooves 30, each containing an O-ring 31 to provide the seal around its circumference. Each access hole cover 28 is secured in its associated access hole 32 by bolts 35 and has a hole 29 and hole plug 33 which is fastened by bolts and which provides means to check the seal condition before the refueling cavity is flooded. Seal plate 10 is provided with an annular support ring 12 and an annular J-shaped flexible ring 11 that extends axially from the seal plate. Support ring 12 is preferably formed from the same material as seal plate 12. Support ring 10 is formed from a plurality of arcuate plates such that they form the annular support ring 12 when positioned adjacent to each other on the refueling pool floor 23. The arcuate plates are splice welded together before being welded to seal plate 10.

J-shaped flexible ring 11 must also be structurally flexible enough to accomodate the radial and axial thermal expansion or contraction of the reactor vessel 26. J-shaped flexible ring 11 is preferably formed from stainless steel which has 0.1 to 0.2 inches thickness. J-shaped flexible ring 11 is formed form a plurality of arcuate plates such that they form an annular J-shaped flexible ring 11 when positioned adjacent to each other on the reactor vessel flange 27. The arcuate plates are splice welded together before being welded to seal plate 10.

Seal plate 10 is welded respectively to support ring 12 and J-shaped flexible ring 11 before in-place installation. Outer seal ring 14 and inner seal ring 13 are preferably formed from the same material as seal plate 10. Outer seal ring 14 and inner seal ring 13 are formed from a plurality of arcuate plates that form the outer seal ring 14 and inner seal ring 13 respectively, when positioned adjacent to each other. The arcuate plates forming the outer and inner seal rings are splice welded together before being attached by bolts 36 and sealingly welded to reactor vessel flange 27 and embedded ring 24 in refueling pool floor 23, respectively. A plurality of support arms 15 underneath the seal plate 10 are provided to support seal plate 10. Each support arm 15 extending from the refueling pool cavity wall 25 toward the seal plate 10 adjacent the J-shaped flexible seal 11 may have at least a leveling screw 16 to adjust the level of seal plate 10.

What is claimed as invention is:

1. A permanent pool cavity seal for a containment arrangement including a wall defining a refueling pool floor and a refueling pool cavity extending about a nuclear reactor vessel having an annular flange thereabout, said permanent pool cavity seal comprising:

an annular inner seal ring mounted on, and extending about, said nuclear reactor flange;

an annular outer seal ring mounted on, and extending about, said refueling pool floor;

an annular support ring upstanding from said outer seal ring, an annular seal plate having its outer periphery sealingly connected to said support ring and its inner periphery disposed above and closely adjacent said inner seal ring;

a plurality of support arms disposed beneath said seal plate and extending radially from said refueling pool cavity wall to engage said seal plate at an intermediate transverse location of a bottom side thereof; and an annular flexible seal operative to accommodate thermally induced axial and radial expansion and contraction of said nuclear reactor vessel with respect to said refueling pool cavity wall, said flexible seal having a cross-section of substantial J-shape and being disposed substantially completely beneath said seal plate, said flexible seal being sealingly weldedly attached about one peripheral edge to said bottom side of said seal plate and about its other peripheral edge to said inner seal ring.

2. The permanent pool cavity seal according to claim 1 in which each of said seal plate, said support ring and said J-shaped flexible seal are formed from a plurality of circumferentially arranged arcuate members.

3. The permanent pool cavity seal according to claim 1 including a plurality of access holes extending through said seal plate at circumferentially spaced locations thereabout, and an access hole cover removably attached to each said access hole.

4. The nuclear containment arrangement of claim 1 wherein each support arm has at least a leveling screw to adjust the level of said seal plate.

* * * * *